US008486186B2

(12) United States Patent
Sato et al.

(10) Patent No.: US 8,486,186 B2
(45) Date of Patent: *Jul. 16, 2013

(54) MAGENTA INK COMPOSITION, INK CARTRIDGE, AND RECORDING SYSTEM AND RECORDED MATTER USING THE SAME

(75) Inventors: Hironori Sato, Shiojiri (JP); Akira Mizutani, Matsumoto (JP); Shuichi Koganehira, Matsumoto (JP); Naoki Okamoto, Aioi (JP); Izumi Yasuda, Himeji (JP)

(73) Assignee: Seiko Epson Corporation (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/191,565

(22) Filed: Jul. 27, 2011

(65) Prior Publication Data

US 2011/0310165 A1    Dec. 22, 2011

Related U.S. Application Data

(63) Continuation of application No. 12/085,141, filed as application No. PCT/JP2006/322833 on Nov. 16, 2006, now Pat. No. 8,016,930.

(30) Foreign Application Priority Data

Nov. 16, 2005 (JP) .................................. 2005-332224
Dec. 16, 2005 (JP) .................................. 2005-364109

(51) Int. Cl.
*C09D 11/02*    (2006.01)
*B41J 2/01*     (2006.01)

(52) U.S. Cl.
USPC ................... 106/31.6; 106/31.78; 106/31.86; 106/31.89; 347/100

(58) Field of Classification Search
USPC ........ 106/31.6, 31.78, 31.86, 31.89; 347/100; 428/195.1
See application file for complete search history.

(56) References Cited

U.S. PATENT DOCUMENTS 3,607,336 A    9/1971    Jaffe
4,895,949 A    1/1990    Jaffe et al.
(Continued)

FOREIGN PATENT DOCUMENTS

CN    1464900      12/2003
DE    69705904 T    9/1997
(Continued)

OTHER PUBLICATIONS

Search Report in European Application 07740853.2 dated Sep. 18, 2008.
(Continued)

*Primary Examiner* — Helene Klemanski
(74) *Attorney, Agent, or Firm* — Harness, Dickey & Pierce, P.L.C.

(57) ABSTRACT

This invention provides a magenta ink composition that, when recorded, is excellent in color development, graininess, and gloss, is less likely to cause clogging in an ink jet recording head, and is excellent in color reproduction in a high-chroma and high-lightness red region. The magenta ink composition has an L* value of not less than 60 and a b* value of not more than −17 when the a* value in CIE standard calculated from a visible absorption spectrum in a not more than 10000-fold diluted aqueous solution is 80.

14 Claims, 4 Drawing Sheets

U.S. PATENT DOCUMENTS

| | | | |
|---|---|---|---|
| 5,236,498 A | 8/1993 | Zaloum et al. | |
| 5,811,213 A | 9/1998 | Chiba | |
| 5,846,306 A | 12/1998 | Kubota et al. | |
| 5,958,129 A | 9/1999 | Urban et al. | |
| 5,964,929 A | 10/1999 | Langley et al. | |
| 6,152,999 A | 11/2000 | Erdtmann et al. | |
| 6,153,000 A | 11/2000 | Erdtmann et al. | |
| 6,336,721 B1 | 1/2002 | Provost et al. | |
| 6,399,674 B1 | 6/2002 | Kashiwazaki et al. | |
| 6,419,733 B1 | 7/2002 | Sano et al. | |
| 6,491,748 B2 | 12/2002 | Watanabe | |
| 6,562,117 B2 | 5/2003 | Sano et al. | |
| 6,562,121 B2 | 5/2003 | Nickel et al. | |
| 6,713,531 B2 | 3/2004 | Iijima | |
| 6,715,868 B2 | 4/2004 | Schmidt et al. | |
| 6,802,893 B1 | 10/2004 | Komatsu et al. | |
| 6,818,054 B2 | 11/2004 | Sano et al. | |
| 6,835,242 B2 | 12/2004 | Nickel et al. | |
| 6,843,840 B2 | 1/2005 | Kataoka et al. | |
| 6,846,353 B2 | 1/2005 | Sano et al. | |
| 6,849,110 B2 | 2/2005 | Sano | |
| 6,877,851 B2 | 4/2005 | Watanabe | |
| 6,924,327 B2 | 8/2005 | Sano et al. | |
| 7,015,259 B2 | 3/2006 | Kataoka | |
| 7,156,910 B2 | 1/2007 | Koganehira et al. | |
| 7,332,023 B2 | 2/2008 | Rehman et al. | |
| 7,384,466 B2 | 6/2008 | Sano et al. | |
| 7,462,231 B2 | 12/2008 | Koganehira et al. | |
| 7,481,524 B2 | 1/2009 | Yamamoto et al. | |
| 7,494,538 B2 | 2/2009 | Koganehira et al. | |
| 7,537,652 B2 | 5/2009 | Koganehira et al. | |
| 7,670,418 B2 | 3/2010 | Kato et al. | |
| 7,686,876 B2 | 3/2010 | Koganehira et al. | |
| 7,731,789 B2 | 6/2010 | Aoki et al. | |
| 7,794,534 B2 * | 9/2010 | Sato et al. | 106/31.6 |
| 7,844,667 B2 | 11/2010 | Ito et al. | |
| 7,871,466 B2 | 1/2011 | Koganehira et al. | |
| 7,932,300 B2 | 4/2011 | Naruse et al. | |
| 8,016,930 B2 * | 9/2011 | Sato et al. | 106/31.6 |
| 8,038,783 B2 * | 10/2011 | Shiono et al. | 106/31.6 |
| 2003/0008938 A1 | 1/2003 | Sano | |
| 2003/0029355 A1 | 2/2003 | Miyabayashi | |
| 2003/0097961 A1 | 5/2003 | Yatake et al. | |
| 2003/0116055 A1 | 6/2003 | Kubota et al. | |
| 2004/0246321 A1 | 12/2004 | Takashima et al. | |
| 2005/0011403 A1 | 1/2005 | Mitina et al. | |
| 2005/0028429 A1 | 2/2005 | Schneidmiller | |
| 2005/0039632 A1 | 2/2005 | Yamamoto et al. | |
| 2005/0041082 A1 | 2/2005 | Kataoka | |
| 2005/0190244 A1 | 9/2005 | Tyrell | |
| 2005/0203210 A1 | 9/2005 | Kataoka et al. | |
| 2005/0235867 A1 | 10/2005 | Jackson et al. | |
| 2005/0235870 A1 | 10/2005 | Ishihara | |
| 2005/0284329 A1 | 12/2005 | Jackson et al. | |
| 2005/0284330 A1 | 12/2005 | Jackson | |
| 2005/0284332 A1 | 12/2005 | Shinjo et al. | |
| 2006/0082629 A1 | 4/2006 | Kato et al. | |
| 2006/0232650 A1 | 10/2006 | Sugimoto et al. | |
| 2006/0264535 A1 | 11/2006 | Oyanagi et al. | |
| 2006/0268084 A1 | 11/2006 | Nishizaki et al. | |
| 2007/0002109 A1 | 1/2007 | Sato et al. | |
| 2007/0026687 A1 | 2/2007 | Kim | |
| 2007/0097193 A1 | 5/2007 | Ma et al. | |
| 2007/0112095 A1 | 5/2007 | Moribe et al. | |
| 2007/0242118 A1 | 10/2007 | Koganehira et al. | |
| 2007/0247504 A1 | 10/2007 | Koganehira et al. | |
| 2007/0266887 A1 | 11/2007 | Koganehira et al. | |
| 2008/0092772 A1 | 4/2008 | Rehman et al. | |
| 2008/0233362 A1 | 9/2008 | Kato | |
| 2009/0030144 A1 | 1/2009 | Mizutani et al. | |
| 2009/0138566 A1 | 5/2009 | Ito et al. | |
| 2009/0142555 A1 | 6/2009 | Sano et al. | |
| 2009/0169834 A1 | 7/2009 | Sano et al. | |
| 2009/0176071 A1 | 7/2009 | Koganehira et al. | |
| 2009/0181219 A1 | 7/2009 | Saito et al. | |
| 2009/0196995 A1 | 8/2009 | Saito et al. | |
| 2009/0297716 A1 | 12/2009 | Koganehira et al. | |
| 2009/0297790 A1 | 12/2009 | Sato et al. | |
| 2009/0304927 A1 | 12/2009 | Kamibayashi et al. | |
| 2009/0308279 A1 | 12/2009 | Koganehira et al. | |
| 2009/0315962 A1 | 12/2009 | Kataoka | |
| 2009/0317606 A1 | 12/2009 | Kataoka | |
| 2009/0317607 A1 | 12/2009 | Kataoka | |
| 2010/0010121 A1 * | 1/2010 | Koganehira et al. | 524/90 |
| 2010/0043670 A1 * | 2/2010 | Shiono et al. | 106/31.6 |
| 2010/0062161 A1 | 3/2010 | Shiono et al. | |
| 2010/0080962 A1 | 4/2010 | Koganehira et al. | |
| 2010/0086685 A1 | 4/2010 | Mizutani et al. | |
| 2010/0087595 A1 | 4/2010 | Koganehira et al. | |
| 2010/0212543 A1 * | 8/2010 | Shiono et al. | 106/31.6 |
| 2010/0289848 A1 | 11/2010 | Koganehira et al. | |
| 2011/0132228 A1 * | 6/2011 | Shiono et al. | 106/31.13 |

FOREIGN PATENT DOCUMENTS

| | | |
|---|---|---|
| DE | 69828579 T | 7/1998 |
| EP | 0 778 321 | 6/1997 |
| EP | 0778321 A | 6/1997 |
| EP | 0827039 A | 3/1998 |
| EP | 0 851 005 A2 | 7/1998 |
| EP | 0851005 A | 7/1998 |
| EP | 0933406 A | 8/1999 |
| EP | 1 164 173 | 12/2001 |
| EP | 1 164 173 A1 | 12/2001 |
| EP | 1 391 301 A1 | 2/2004 |
| EP | 1403334 A1 | 3/2004 |
| EP | 1457535 A1 | 9/2004 |
| EP | 1676893 A1 | 7/2006 |
| EP | 1741762 A | 1/2007 |
| EP | 1741762 A1 | 1/2007 |
| EP | 1 811 003 | 7/2007 |
| EP | 1811003 A1 | 7/2007 |
| EP | 1 908 806 | 4/2008 |
| EP | 1908806 A1 | 4/2008 |
| JP | 11-049998 A | 2/1989 |
| JP | 08-123017 A | 5/1996 |
| JP | 08-123017 A | 5/1996 |
| JP | 10-123760 A | 5/1998 |
| JP | 10-219166 | 8/1998 |
| JP | H10-219166 A | 8/1998 |
| JP | 10-330640 | 12/1998 |
| JP | 10-330640 A | 12/1998 |
| JP | 11-005230 | 1/1999 |
| JP | 11-005230 A | 1/1999 |
| JP | 11-049998 A | 2/1999 |
| JP | 11-166128 | 6/1999 |
| JP | 11-166128 A | 6/1999 |
| JP | 2000-319534 A | 11/2000 |
| JP | 2000-351928 | 12/2000 |
| JP | 2000-355667 A | 12/2000 |
| JP | 2001-106951 | 4/2001 |
| JP | 2001-106951 A | 4/2001 |
| JP | 2002-030230 | 1/2002 |
| JP | 2002-030230 A | 1/2002 |
| JP | 2002-100959 | 4/2002 |
| JP | 2002-100959 A | 4/2002 |
| JP | 2003-012583 | 1/2003 |
| JP | 2003-012583 A | 1/2003 |
| JP | 2003-123760 | 4/2003 |
| JP | 2003-123760 A | 4/2003 |
| JP | 2003-160750 A | 6/2003 |
| JP | 2003-213179 | 7/2003 |
| JP | 2003-213179 A | 7/2003 |
| JP | 2003-253150 | 9/2003 |
| JP | 2003-253167 | 9/2003 |
| JP | 2003-253167 A | 9/2003 |
| JP | 2003-268275 | 9/2003 |
| JP | 2003-268275 A | 9/2003 |
| JP | 2003-292835 A | 10/2003 |
| JP | 2003-313480 | 11/2003 |
| JP | 2003-313480 A | 11/2003 |
| JP | 2003-313480 A | 11/2003 |
| JP | 2004-051881 | 2/2004 |
| JP | 2004-051881 A | 2/2004 |
| JP | 2004-066558 | 3/2004 |
| JP | 2004-197055 A | 7/2004 |
| JP | 2004-276397 A | 7/2004 |
| JP | 2004-526019 A | 8/2004 |

| | | | |
|---|---|---|---|
| JP | 2004-276397 A | 9/2004 | |
| JP | 2004-276397 A | 10/2004 | |
| JP | 2004-277585 | 10/2004 | |
| JP | 2004-277585 A | 10/2004 | |
| JP | 2004-314352 | 11/2004 | |
| JP | 2004-314352 A | 11/2004 | |
| JP | 2005-041906 | 2/2005 | |
| JP | 2005120310 | 5/2005 | |
| JP | 2005-194500 | 7/2005 | |
| JP | 2005-194500 A | 7/2005 | |
| JP | 2004-066558 A | 8/2005 | |
| JP | 2004-246397 A | 8/2005 | |
| JP | 2005-225955 A | 8/2005 | |
| JP | 2005-225958 A | 8/2005 | |
| JP | 2005-248178 | 9/2005 | |
| JP | 2005-248178 A | 9/2005 | |
| JP | 2005-255959 | 9/2005 | |
| JP | 2005-255959 A | 9/2005 | |
| JP | 2005-298813 | 10/2005 | |
| JP | 2005-298813 A | 10/2005 | |
| JP | 2005-314546 A | 11/2005 | |
| JP | 2005-120310 A | 12/2005 | |
| JP | 2005-364109 | 12/2005 | |
| JP | 2006-104244 | 4/2006 | |
| JP | 2006-104244 A | 4/2006 | |
| JP | 2006-328140 A | 7/2006 | |
| JP | 2006-249335 | 9/2006 | |
| JP | 2006-249429 | 9/2006 | |
| JP | 2006-249429 A | 9/2006 | |
| JP | 3829993 | 9/2006 | |
| JP | 2006-282802 | 10/2006 | |
| JP | 2006-282802 A | 10/2006 | |
| JP | 2006-282810 | 10/2006 | |
| JP | 2006-307137 | 11/2006 | |
| JP | 2006-307137 A | 11/2006 | |
| JP | 2006-328140 | 12/2006 | |
| JP | 2006-336001 A | 12/2006 | |
| JP | 2007-146127 | 6/2007 | |
| JP | 2007-146127 A | 6/2007 | |
| JP | 2007-186641 A | 7/2007 | |
| JP | 2007-186642 | 7/2007 | |
| JP | 2007-277342 A | 10/2007 | |
| JP | 2007-297516 | 11/2007 | |
| JP | 2007-297595 | 11/2007 | |
| JP | 2007-297595 A | 11/2007 | |
| JP | 2007-297596 | 11/2007 | |
| JP | 2009-209338 A | 9/2009 | |
| JP | 2009-209339 A | 9/2009 | |
| JP | 2009-209340 A | 9/2009 | |
| JP | 2010-047723 | 3/2010 | |
| JP | 2010-065119 | 3/2010 | |
| JP | 2010-195857 A | 9/2010 | |
| WO | 99-05230 A | 2/1999 | |
| WO | 2001-062855 A2 | 8/2001 | |
| WO | 02-100959 A | 12/2002 | |
| WO | 2004-39900 A | 5/2004 | |
| WO | 2006-04001 A | 1/2006 | |
| WO | 2007/058245 A1 | 5/2007 | |
| WO | 2007-116868 A | 10/2007 | |
| WO | 2008-143086 A | 11/2008 | |
| WO | 2008/143086 A1 | 11/2008 | |

OTHER PUBLICATIONS

Printout of Search in Registry Files of STN for Pigment Blue 15:6; 2 pages, no date available.
Computer-Generated English Translation of Japanese Application 08-123017 A Published May 17, 1996.
Computer-Generated English Translation of Japanese Application 11-005230 A Published Jan. 12, 1999.
Computer-Generated English Translation of Japanese Application 2002-100959 Published Apr. 5, 2002.
Computer-Generated English Translation of Japanese Application 2003-123760 Published Apr. 25, 2003.
Computer-Generated English Translation of Japanese Application 11-005230 Published Jan. 12, 1999.
Computer-Generated English Translation of Japanese Application 2002-100959 A Published Apr. 5, 2002.
Computer-Generated English Translation of Japanese Application 2004-066558 Published Mar. 4, 2004.
Computer-Generated English Translation of Japanese Application 2004-276397 Published Oct. 7, 2004.
Computer-Generated English Translation of Japanese Application 2004-314352 Published Nov. 11, 2004.
Computer-Generated English Translation of Japanese Application 2005-225955 Published Aug. 25, 2005.
Computer-Generated English Translation of Japanese Application 2005-225958 A Published Aug. 25, 2005.
Computer-Generated English Translation of Japanese Application 2006-249335 Published Sep. 21, 2006.
Computer-Generated English Translation of Japanese Application 2007-186641 A Published Jul. 26, 2007.
English translation of JP 2003/313480, Nov. 2003.
Patent Abstracts of Japan English abstract of JP 10-219166, Aug. 1998.
Patent Abstracts of Japan English abstract of JP 10-330640, Dec. 1998.
English Patent Abstract of JP 2001-106951 dated Apr. 17, 2001.
English Patent Abstract of JP 2002-030230 dated Jan. 31, 2002.
English Patent Abstract of JP 2003-253150 dated Sep. 10, 2003.
English Patent Abstract of JP 2003-268275 dated Sep. 25, 2003.
English Patent Abstract of JP 2003-313480 dated Nov. 6, 20030.
English Patent Abstract of JP 2004-051881 dated Feb. 19, 2004.
English Patent Abstract of JP 2004-277585 dated Oct. 7, 2004.
English Patent Abstract of JP 2005-255959 dated Sep. 22, 2005.
English Patent Abstract of JP 2006-282802 dated Oct. 19, 2006.
English Patent Abstract of JP 2006-282810 dated Oct. 19, 2006.
English Abstract of Japanese Application No. 11-049998 Published Feb. 23, 1999.
English Abstract of Japanese Application No. 2000-319534 A Published Nov. 21, 2000.
English Abstract of Japanese Application No. 2003-253150 A Published Sep. 10, 2003.
English Abstract of Japanese Application No. 2006-282810 A Published Oct. 19, 2006.
English Abstract of Japanese Application No. 2007-186641 A Published Jul. 26, 2006.
Search Report in European Application 0080115324, Sep. 12, 2008.
Search Report in European Application 07740853.2 Dated Mar. 17, 2011.
English Translation of Japanese Application 08-123017 A Published May 17, 1996.
English Translation of Japanese Application 10-219166 Published Aug. 18, 1998.
English Translation of Japanese Application 10-330640A Published Dec. 15, 1998.
English Translation of Japanese Application 11-005230A Published Jan. 12, 1999.
English Translation of Japanese Application 2002-030230A Published Jan. 31, 2002.
English Translation of Japanese Application 2002-100959A Published Apr. 5, 2002.
English Translation of Japanese Application 2003-1123760 Published Apr. 25, 2003.
English Translation of Japanese Application 2003-253150 Published Sep. 10, 2003.
English Translation of Japanese Application 2003-313480 Published Nov. 6, 2003.
English Translation of Japanese, Application 2004-051881 Published Febr. 19, 2004.
English Translation of Japanese Application 2004-066558A Published Aug. 25, 2005.
English Translation of Japanese Application 2004-276397A Published Jul. 7, 2004.
English Translation of Japanese Application 2004-277585 Published Oct. 7, 2004.
English Translation of Japanese Application 2004-314352 A Published Nov. 11, 2004.
English Translation of Japanese Application 2005-225955 Published Aug. 25, 2005.

English Translation of Japanese Application 2005-225958 Published Aug. 25, 2005.
English Translation of Japanese Application 2005-255959 Published Sep. 22, 2005.
English Abstract of Japanese Application 2006-249335 A Published Sep. 21, 2006.
English Abstract of Japanese Application 2006-282802 Published Oct. 19, 2006.
English Patent Abstract of Japan 2006-28281 Published Oct. 19, 2006.
English Patent Abstract of Japan 2007-186641 Published Jul. 26, 2007.
English Abstract of Japanese Application 2000-351928 Published Dec. 19, 2000.
English Abstract of Japanese Application 2007-297595A Published Nov. 15, 2007.
English Abstract of Japanese Application 2000-355667A Published Dec. 26, 2000.
Computer-Generated English Translation of Japanese 2006-336001A Published Dec. 14, 2006.
Computer-Generated Translation of Japanese Application 08-123017A Published May 17, 1996.
English Abstract of Japanese Application 2005-248178A Published Sep. 15, 2005.
English Abstract of Japanese Application 2006-307137A Published Nov. 9, 2006.
Computer-Generated Translation of Japanese Application 2003-012583A Published Jan. 15, 2003.
Computer-Generated Translation of Japanese Application 2003-213179A Published Jul. 30, 2003.
Computer-Generated Translation of Japanese Application 2003-253167A Published Sep. 10, 2003.
Computer-Generated Translation of Japanese Application 2005-194500A Published Jul. 21, 2005.
English Abstract of Japanese Application 2005-298813A Published Oct. 27, 2005.
English Abstract of Japanese Application 2006-104244A Published Apr. 20, 2006.
English Abstract of Japanese Application 2007-146127A Published Jun. 14, 2007.
English Abstract of Japanese Application 2006-249429A Published Sep. 21, 2006.
English Abstract of Japanese Application 2007-277342A Published Oct. 25, 2007.
English Abstract of Japanese Application 2009-209338A Published Sep. 17, 2009.
English Abstract of Japanese Application 2009-209339A Published Sep. 17, 2009.
English Abstract of Japanese Application 2009-209340A Published Sep. 17, 2009.
Computer-Generated English Translation of Japanese Application 11-049998A Published Feb. 23, 1999.
Computer-Generated English Translation of Japanese Application 2000-319534A Published Nov. 21, 2000.
Office Action in U.S. Appl. No. 10/572,738 Dated Jul. 23, 2009.
Final Office Action in U.S. Appl. No. 10/572,738 Dated Feb. 4, 2010.
Office Action in U.S. Appl. No. 12/085,141 Dated Aug. 17, 2010.
Printout of Search in Registry Files of STN for Pigment Blue 15:6; 2 Pages.
Search Report EP07740853.2 Dated Mar. 17, 2011.
Office Action in U.S. Appl. No. 11/732,082 Dated Jan. 14, 2008.
Office Action in U.S. Appl. No. 11/732,113 Dated Apr. 3, 2008.
International Preliminary Report on Patentability PCT/JP2008/058848 Dated Nov. 24, 2009.
Search Report EP08011532.2 Dated Sep. 18, 2008.
Office Action in U.S. Appl. No. 12/539,084 Dated Oct. 28, 2009.
Final Office Action in U.S. Appl. No. 12/539,084 Dated Sep. 1, 2010.
Office Action in U.S. Appl. No. 12/545,944 Dated Jun. 15, 2010.
Final Office Action in U.S. Appl. No. 12/545,944 Dated Nov. 8, 2010.
Japan Hardcopy '99 Collection of Papers "Image Quality Evaluation of Inkjet Prints" Makoto Fujimoto, Seiko Epson Corporation TP R&D Center, pp. 291-294.
Disclosed Anonymously, "Pigmented magenta inks and their use in ink printing." May 19, 2005, [cited Sep. 24, 2005] Available from: [http:://www.ip.com].
Other evidence.
IPCOM000028527D.
W. Herbst, K. Hunger: Industrial Organic Pigments, 3rd ed., 2004, pp. 464-467.
Specification of Emulgen 147.
Computer-Generated Translation of Japanese 2004-197055 Published Jul. 15, 2004.
Computer-Generated English Translation of Japanese H10-219166A Published Aug. 18, 1998.
Computer-Generated English Translation of Japanese 2003-313480A Published Nov. 6, 2003.
English Translation of Japanese 2005-364109 Published Dec. 16, 2005.
EP Opposition Dated Jan. 10, 2012.
EP Opposition Dated Apr. 10, 2012.
Response Filed with USPTO on Nov. 17, 2010 in Response to Office Action Mailed Aug. 17, 2010 in U.S. Appl. No. 12/085,141 (Now U.S. Patent 8,016,930).

* cited by examiner

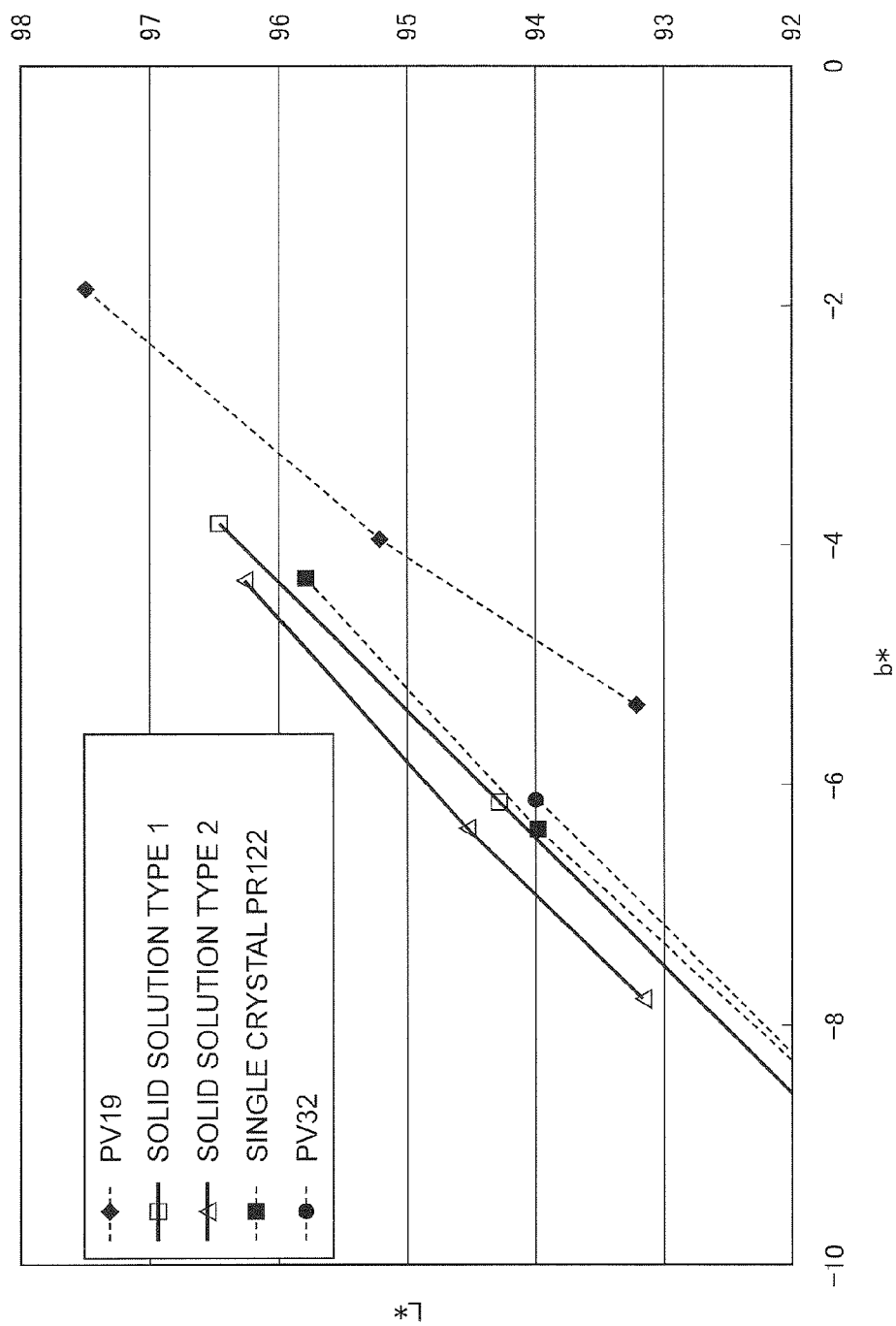

MAGENTA INK COMPOSITION, INK CARTRIDGE, AND RECORDING SYSTEM AND RECORDED MATTER USING THE SAME

CROSS-REFERENCE TO RELATED APPLICATIONS

This application is a continuation of U.S. patent application Ser. No. 12/085,141 filed Apr. 15, 2009, which is national phase of PCT Application PCT/JP2006/322833 filed on Nov. 16, 2006 (now U.S. Pat. No. 8,016,930), which claimed the benefit of the following Japanese Patent Applications: 2005/332224 filed Nov. 16, 2005 and 2005/364109 filed Dec. 16, 2005, the contents of which are incorporated herein by reference.

TECHNICAL FIELD

The present invention relates to a new magenta ink composition, and more particularly, a magenta ink composition that, when recorded, is excellent in color development, graininess, and gloss, is less likely to cause clogging in an ink jet recording head, and is excellent in color reproduction in a high-chroma and high-lightness red region, an ink cartridge including the same, and a recording system and a recorded matter using the same.

BACKGROUND ART

Conventionally, as a color ink jet recording magenta ink, a magenta ink using pigment such as single crystal C.I. pigment red 122 or C.I. pigment violet 19 or 32 as a coloring material was suggested (for example, see Patent Document 1 and Patent Document 2).

The single crystal C.I. pigment red 122 (hereinafter, also referred to single crystal PR122) is relatively excellent in color development, graininess, and gloss. In addition, since color development is good, color reproduction is relatively good although the concentration of the pigment is relatively low.

However, there is a need for a magenta ink that, when recorded, is excellent in color development, graininess, and gloss and is excellent in color reproduction in a high-chroma and high-lightness red region and violet region.

Even in the C.I. pigment violet 19 or 32 (hereinafter, also referred to as PV19 or PV32), a new improvement of color development, graininess, and gloss when recorded and color reproduction in a high-chroma and high-lightness red region and violet region is required.

That is, the PV19 has a high L* value, but has a relatively small a* value. Accordingly, new high chroma is required. Since the PV19 has a relatively high b* value, there is a need for a magenta ink which is excellent in color reproduction in a low-lightness violet region. Meanwhile, since a high a* value and a high L* value are not sufficiently realized in the PV32, new high-lightness is required. In addition, a new improvement of color development, graininess and gloss is required.

Patent Document 1: Japanese Unexamined Patent Application NO. 2003-268275

Patent Document 2: Japanese Unexamined Patent Application NO. 2002-030230

DISCLOSURE OF THE INVENTION

Problems to be Solved by the Invention

An object of the present invention is to provide a magenta ink composition that, when recorded, is excellent in color development, graininess, and gloss, is less likely to cause clogging in an ink jet recording head, and is excellent in color reproduction in a high-chroma and high-lightness red region and violet region.

Another object of the present invention is to provide an ink cartridge including the excellent magenta ink composition.

Another object of the present invention is to provide a recording system and a recorded matter using the excellent magenta ink composition.

Means for Solving the Problems

As a result of intensive investigation, the present inventors found that the magenta ink composition which has an L* value of not less than 60 and a b* value of not more than −17 when the a* value in CIE standard calculated from a visible absorption spectrum in a not more than 10000-fold diluted aqueous solution is 80 is excellent in color development, graininess, and gloss and is excellent in color reproduction in a high-chroma and high-lightness red region as a coloring material, and completed the present invention.

That is, according to the present invention, there are (1) a magenta ink composition wherein an L* value is not less than 60 and a b* value is not more than −17 when an a* value in CIE standard calculated from a visible absorption spectrum in a not more than 10000-fold diluted aqueous solution is 80; (2) the magenta ink composition according to (1), wherein the L* value is not less than 96 and the a* value is not less than 7.5 in the CIE standard calculated from the visible absorption spectrum in an aqueous solution having a pigment concentration of $2\times10^{-3}$ g/l; (3) the magenta ink composition according to (1), wherein the a* value is not less than 11.5 and the b* value is not more than −5.5 when the L* value in CIE standard calculated from the visible absorption spectrum in a not more than 10000-fold diluted aqueous solution is 94; (4) the magenta ink composition according to (1) including at least a solid solution of γ-type C.I. pigment violet 19 and C.I. pigment red 202; (5) the magenta ink composition according to (4) including a pigment dispersion obtained by a method of kneading the solid solution at a temperature higher than 120° C. and preparing a pigment kneaded material; (6) the magenta ink composition according to (5) including a pigment dispersion obtained by a method including kneading the solid solution at a temperature higher than 120° C. and preparing a pigment kneaded material and dispersing the composition including the pigment kneaded material to a dispersion treatment material; (7) the magenta ink composition according to (6), wherein the method includes performing an ultrafiltration classification process with respect to the dispersion treatment material; (8) the magenta ink composition according to (4), wherein, in the solid solution, the weight of the γ-type C.I. pigment violet 19 is larger than that of the C.I. pigment red 202; (9) the magenta ink composition according to (4), wherein, in the solid solution, a ratio of the weight of the γ-type C.I. pigment violet 19 to the weight of the C.I. pigment red 202 is preferably 70/30 to 50/50; (10) the magenta ink composition according to any one of (1) to (9) including one, two, or more types of polyhydric alcohols, sugars and polyhydric alcohols with ethylene oxide chains as a wetting agent; (11) the magenta ink composition according to any one of (1) to (9) including one, two, or more types of pyrrolidones, alkanediols, glycol ethers as a penetrant; (12) the magenta ink composition according to any one of claims 1) to (9) including one, two, or more types of acetylene glycols and polysiloxanes as the surfactant; and (13) the magenta ink composition according to (12), wherein polysiloxanes are expressed by the following formula;

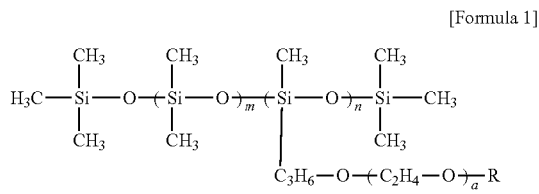

[Formula 1]

(In Formula, R denotes a hydrogen atom or a methyl group, a denotes an integer of 7 to 13, m denotes an integer of 2 to 770 and n denotes an integer of 1 to 5). (14) the magenta ink composition according to (12), wherein polysiloxanes are expressed by the following formula;

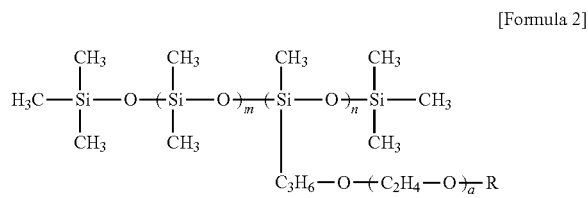

[Formula 2]

(In Formula, R denotes a hydrogen atom or a methyl group, a denotes an integer of 2 to 11, m denotes an integer of 2 to 50 and n denotes an integer of 1 to 5.); (15) the magenta ink composition for ink jet recording according to any one of (1) to (9) which is used for ink jet recording; (16) an ink cartridge including the magenta ink composition according to any one of (1) to (9); (17) a recording system for forming an image using the magenta ink composition according to any one of (1) to (9); and (18) a recorded matter on which an image is formed using the magenta ink composition according to any one of (1) to (9).

Effect of the Invention

According to the present invention, there are provided a magenta ink composition that, when recorded, is excellent in color development, graininess, and gloss, is less likely to cause clogging in an ink jet recording head, and is excellent in color reproduction in a high-chroma and high-lightness red region and violet region, an ink cartridge including the excellent ink composition, and a recording system and a recorded matter using the excellent ink composition.

BRIEF DESCRIPTION OF THE DRAWINGS

FIG. 4 is a graph showing a relationship between L* values and b* values of aqueous solutions diluted using magenta ink compositions.

BEST MODE FOR CARRYING OUT THE INVENTION

Figure 1:
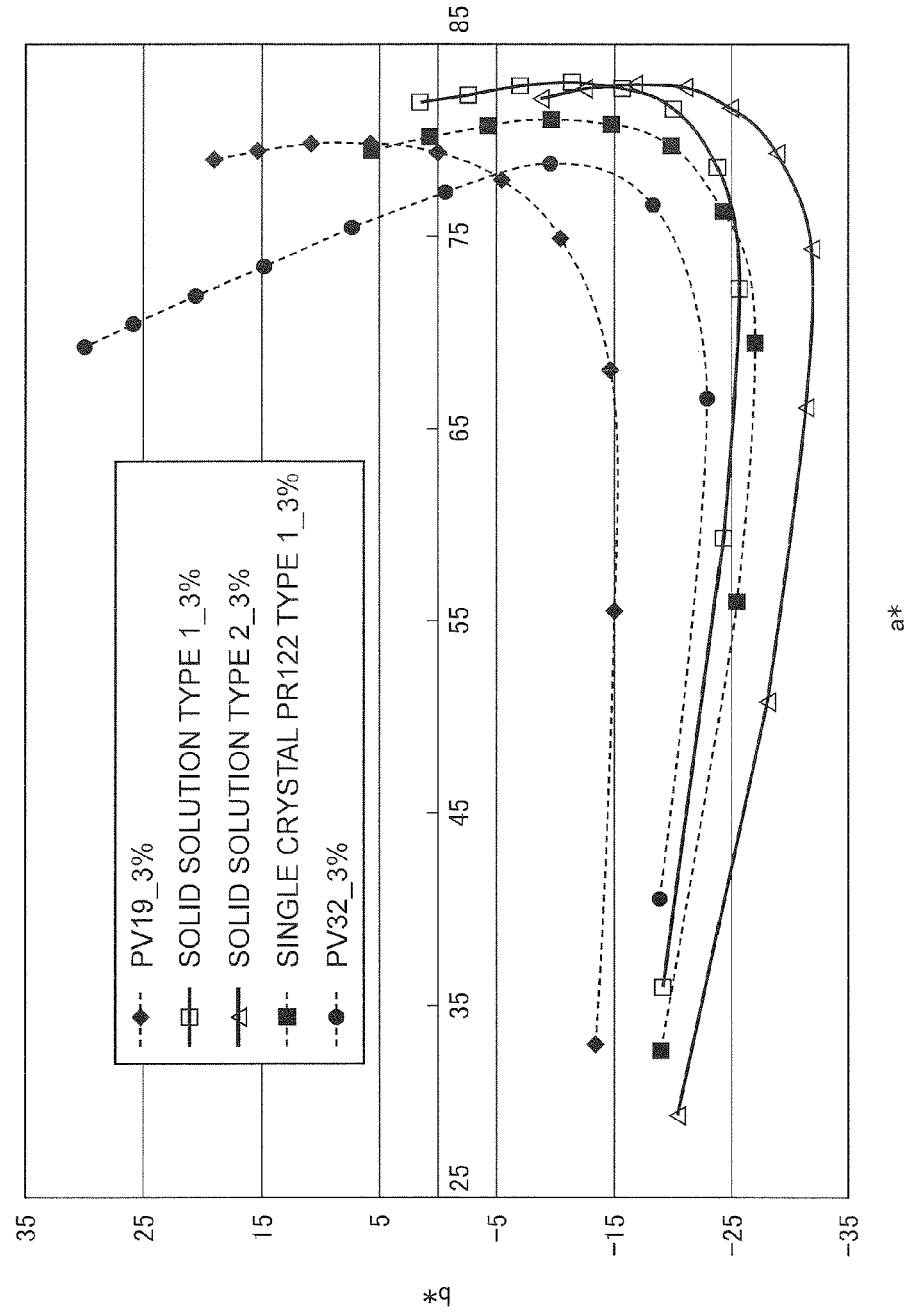
FIG. 1 is a graph showing a relationship between a* values and b* values of recorded matters recorded using magenta ink compositions.

Hereinafter, embodiments of the present invention will be described. The following embodiments are only examples of the present invention and the present invention is not limited to the following embodiments. The present invention may be modified without departing from the scope of the present invention.

[Magenta Ink Composition]

A magenta ink composition according to the present invention has an L* value of not less than 60 and a b* value of not more than −17 when the a* value in CIE standard calculated from a visible absorption spectrum in a not more than 10000-fold diluted aqueous solution is 80.

By this configuration, a magenta ink composition that, when recorded, is excellent in color development, graininess, and gloss, is less likely to cause clogging in an ink jet recording head, and is excellent in color reproduction in a high-chroma and high-lightness red region and violet region is provided.

In the magenta ink composition according to the present invention, since color development is good, color reproduction in the high-chroma and high-lightness region is excellent although a pigment concentration is relatively low. Since color reproduction is excellent although the pigment concentration is relatively low, it is possible to prevent the viscosity of the ink from being by increasing the pigment concentration.

In the magenta ink composition according to the present invention, color development is remarkably improved in regular paper when the concentration of the pigment is increased.

The magenta ink composition according to the present invention is excellent in gas resistance, light resistance and metamerism resistance.

The magenta ink composition preferably has an L* value of not less than 96 in CIE standard calculated from the visible absorption spectrum and an a* value of not less than 7.5 in an aqueous solution having a pigment concentration of $2\times10^{-3}$ g/l.

By this suitable configuration, in addition to the effect of the present invention, a magenta ink composition which is remarkably excellent in graininess and color development is provided.

The magenta ink composition preferably has an a* value of not less than 11.5 and a b* value of not more than −5.5 when the L* value in CIE standard calculated from the visible absorption spectrum in a not more than 10000-fold diluted aqueous solution is 94.

By this suitable configuration, in addition to the effect of the present invention, a magenta ink composition which is remarkably excellent in graininess, color development, gloss, metamerism resistance, gas resistance, and light resistance is provided.

The suitable magenta ink composition preferably includes at least a solid solution of γ-type C.I. pigment violet 19 and C.I. pigment red 202.

By this configuration, the effect of the present invention will be realized.

The γ-type C.I. pigment violet 19 and C.I. pigment red 202 indicates crystal in which γ-type PV19 and PR202 are dissolved in each other in a solid state.

The suitable magenta ink composition includes at least a predetermined solid solution and may further include other magenta-based pigments such as PV19 or PV32 or other pigments if the solid solution is included. A ratio of γ-type PV19 to PR202 of the solid solution in amount can be properly adjusted in the scope of the present invention.

The L* value, the a* value and the b* value in CIE standard calculated from the visible absorption spectrum can be obtained by measuring transmissivity under the condition that a scan speed is 600 nm/min, a measurement wavelength range is 380 to 800 nm and a slit width is 2.0 nm using U3300 manufactured by Hitachi Ltd. and performing calculation in a D65 light source and a viewing angle of 2 degrees.

The magenta ink composition preferably includes a pigment dispersion obtained by a method of kneading the solid solution at a temperature higher than 120° C. and preparing a pigment kneaded material.

The magenta ink composition preferably includes a pigment dispersion obtained by a method including kneading the solid solution at a temperature higher than 120° C. and preparing a pigment kneaded material and dispersing the composition including the pigment kneaded material to a dispersion treatment material.

The method preferably includes a step of performing an ultrafiltration classification process with respect to the dispersion treatment material.

The solid solution has a fast dispersion speed and excellent production efficiency. However, if the dispersion is rapidly made, clogging or unevenness in color development occurs. Accordingly, in order to efficiently suppress clogging, kneading is mad before the dispersion of fine particles. In order to efficiently suppress color unevenness, the ultrafiltration classification is performed.

In the solid solution, the weight of the γ-type C.I. pigment violet 19 is larger than that of the C.I. pigment red 202.

In the solid solution, a ratio of the weight of the γ-type C.I. pigment violet 19 to the weight of the C.I. pigment red 202 is preferably 70/30 to 50/50.

By this suitable configuration, a magenta ink composition that, when recorded, is excellent in color development and is excellent in color reproduction in a high-chroma and high-lightness red region and violet region is provided.

It is preferable that the magenta ink composition according to the present invention uses the pigment as the coloring material and includes a dispersing agent for dispersing the pigment. Dispersing agents which can be used in this type of pigment ink can be used without limitation and, for example, a cation dispersing agent, an anion dispersing agent, a non-ionic dispersing agent, or a surfactant may be used.

Examples of the anion dispersing agent include polyacrylic acid, polymethacrylic acid, acrylic acid-acrylonitrile copolymers, vinyl acetate-acrylic ester copolymers, acrylic acid-acrylate alkyl ester copolymers, styrene-acrylic acid copolymers, styrene-methacrylic acid copolymers, styrene-acrylic acid-acrylate alkyl ester copolymers, styrene-methacrylic acid-acrylate alkyl ester copolymers, styrene-α-methylstyrene-acrylic acid copolymers, styrene-α-methylstyrene-acrylic acid-acrylate alkyl ester copolymers, styrene-maleic acid copolymers, vinylnaphthalene-maleic acid copolymers, vinyl acetate-ethylene copolymers, vinyl acetate-fatty acid vinyl ethylene copolymers, vinyl acetate-maleate copolymers, vinyl acetate-crotonic acid copolymers, and vinyl acetate/acrylic acid copolymers.

Examples of the non-ionic dispersing agent include polyvinyl pyrrolidone, polypropylene glycol, and vinyl pyrrolidone-vinyl acetate copolymers.

Examples of the surfactants as the dispersing agent include the anion surfactant such as sodium dodecylbenzenesulfonate and sodium laurylate, ammonium salts of polyoxyethylene alkyl ether sulfates, and the nonionic surfactant such as polyoxyethylene alkyl ethers, polyoxyethylene alkyl esters, polyoxyethylene sorbitan fatty acid esters, polyoxyethylene alkyl phenyl ethers, polyoxyethylene alkylamines, and polyoxyethylene alkylamides. In particular, from the viewpoint of increasing the dispersion stability of the pigment, the use of styrene-(meth)acrylic acid copolymers is preferred.

In the magenta ink according to the present invention, one, two, or more types of polyhydric alcohols, sugars and polyhydric alcohols with ethylene oxide chains is preferably included as a wetting agent.

By adding the wetting agent, it is possible to prevent the ink from being dried and prevent a head of an ink jet printer from being clogged.

Examples of the wetting agent include ethylene glycol, diethylene glycol, triethylene glycol, polyethylene glycol, polypropylene glycol, propylene glycol, butylene glycol, 1,2, 6-hexanetriol, thiodiglycol, hexylene glycol, glycerin, trimethylolethane, trimethylolpropane, and other polyhydric alcohols; sugar alcohol and other sugars; and ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, triethylene glycol monobutyl ether, and other polyhydric alcohols with ethylene oxide chains. One, two, or more types of these may be used.

In the magenta ink composition according to the present invention, one, two, or more types of pyrrolidones, alkanediols, glycol ethers is preferably included as a penetrant.

By adding the penetrant, the wettability of the recording medium can be increased and the permeability of the ink can be increased.

Examples of the penetrant include 2-pyrrolidone, N-methyl-2-pyrrolidone and other pyrrolidones; 1,2-pentanediol, 1,2-hexanediol, and other alkanediols; and ethylene glycol monoethyl ether, diethylene glycol monoethyl ether, diethylene glycol monobutyl ether, triethylene glycol monobutyl ether, propylene glycol monobutyl ether, dipropylene glycol monobutyl ether and other glycol ethers. One, two, or more types of these may be used.

In the magenta ink composition according to the present invention, one, two, or more types of acetylene glycols and polysiloxanes is preferably included as the surfactant.

By adding the surfactant, the wettability of the recording medium can be increased and the permeability of the ink can be increased.

As polysiloxanes which can be used as the surfactant, polyorganosiloxanes expressed by the following formula are preferred.

[Formula 3]

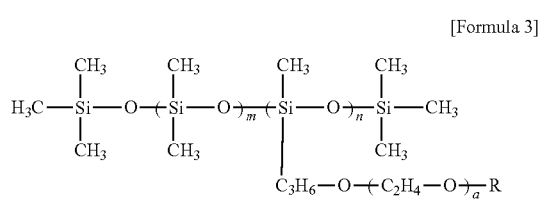

(In Formula, R denotes a hydrogen atom or a methyl group, a denotes an integer of 7 to 13, m denotes an integer of 2 to 770 and n denotes an integer of 1 to 5.) By this suitable configuration, a recorded matter which is more excellent in gloss can be obtained.

As polysiloxanes, polyorganosiloxanes expressed by the following formula are also preferred.

[Formula 4]

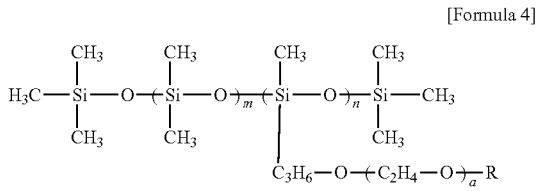

(In Formula, R denotes a hydrogen atom or a methyl group, a denotes an integer of 2 to 11, m denotes an integer of 2 to 50 and n denotes an integer of 1 to 5.)

By this suitable configuration, it is possible to suppress agglomeration unevenness when recorded on print paper.

If the magenta ink composition according to the present invention includes polyorganosiloxane, one, two, or more types of polyorganosiloxane may be included.

In the magenta ink composition according to the present invention, from the viewpoint of reducing the ink drying time, a low-boiling organic solvent may be included. Examples of low-boiling solvents include methanol, ethanol, n-propyl alcohol, iso-propyl alcohol, n-butanol, sec-butanol, tert-butanol, isobutanol, n-pentanol, and the like; and one, two, or more types of these may be used. The use of a monohydric alcohol in particular is preferred.

In the magenta ink composition according to the present invention, components such as the pigment, the dispersing agent, the wetting agent, the low-boiling organic solvent, the penetrant, and the surfactant are included and water is included as the balance. Deionized water, ultrafiltrated water, reverse osmotic water, distilled water, or another type of pure or ultrapure water is preferably used for water. In particular, water obtained by sterilizing this type of water through irradiation with ultraviolet light, addition of hydrogen peroxide, or the like is preferred because the occurrence of mold and bacteria are prevented over a long period of time.

The magenta ink composition according to the present invention may contain, as required, water-soluble rosins or other stabilizers, sodium benzoate or other antifungal agents/preservatives, allophanates or other antioxidants/ultraviolet absorbers, chelating agents, pH regulators, and other additives; and one, two, or more types of these may be used.

The magenta ink composition according to the present invention is preferably used in inkjet recording processes, which are recording medium methods whereby droplets of ink are ejected from a nozzle, and the droplets are allowed to adhere to a recording medium to form characters and/or images, and are particularly preferred for use in on-demand inkjet recording processes. Examples of on-demand inkjet recording processes include piezoelement recording methods whereby recording is performed by using a piezoelement disposed in the printer head, and thermal jet recording methods whereby recording is performed by using thermal energy generated by a heater or other component of a heating resistive element disposed in the printer head, and may be advantageously used in either type of inkjet recording method.

The magenta ink composition according to the present invention may be an ink jet recording magenta ink composition which is used for ink jet recording.

[Ink Cartridge]

An ink cartridge according to the present invention includes the above-described magenta ink composition. In the ink cartridge according to the present invention, it is possible to obtain an image that, when recorded, is excellent in color development, graininess, and gloss, is less likely to cause clogging in an ink jet recording head, and is excellent in color reproduction in a high-chroma and high-lightness red region.

[Recording System]

A recording system according to the present invention forms an image using the above-described magenta ink composition.

In the ink cartridge according to the present invention, it is possible to obtain an image that, when recorded, is excellent in color development, graininess, and gloss, is less likely to cause clogging in an ink jet recording head, and is excellent in color reproduction in a high-chroma and high-lightness red region.

[Recorded Matter]

In a recorded matter according to the present invention, an image is formed using the above-described magenta ink composition.

The magenta ink composition according to the present invention is applicable to a recording medium which is generally used in an ink jet recording method as a recording medium for forming an image without limitation and is suitably applied to a regular paper (a recording medium in which a fiber is exposed to a recorded surface) and media having a coating layer.

Embodiments

The present invention is described in detail below with embodiments and experimental examples of the present invention, but the present invention is not limited in any way by these embodiments. It may be apparent by those skilled in the art that the following embodiments may be variously modified and the modifications are included in the scope of the claims.

Example A

As the magenta ink composition according to the present invention, a magenta ink composition which is a solid solution of γ-type PV19 and PR202 (hereinafter, referred to as a solid solution) and includes a solid solution type 1 in which a ratio of the weight of γ-type PV19 to the weight of PR202 is 70:30 was prepared.

A composition (M1-1) in which the concentration of the solid solution type 1 is 2 wt %, a composition (M1-2) in which the concentration of the solid solution type 1 is 4 wt %, and a composition (M1-3) in which the concentration of the solid solution type 1 is 6 wt % were prepared.

M1-1

Embodiment

| | |
|---|---|
| Solid solution type 1 | 2.0 wt % |
| Dispersing agent (styrene-acrylic acid copolymer) | 2.8 wt % |
| Glycerin | 12.0 wt % |
| 1,2-hexanediol | 7.0 wt % |
| Triethanolamine | 0.9 wt % |
| KF-353A (manufactured by Shin-Etsu Chemical Co., Ltd.) | 0.1 wt % |
| Ultrapure water | Remainder |
| Total | 100.0 wt % |

M1-2

Embodiment

| | |
|---|---|
| Solid solution type 1 | 4.0 wt % |
| Dispersing agent (styrene-acrylic acid copolymer) | 2.0 wt % |
| Glycerin | 14.0 wt % |
| 1,2-hexanediol | 7.0 wt % |

-continued

| | |
|---|---|
| Triethanolamine | 0.9 wt % |
| KF-353A (made by Shin-Etsu Chemical Co., Ltd.) | 0.1 wt % |
| Ultrapure water | Remainder |
| Total | 100.0 wt % |

M1-3

Embodiment

| | |
|---|---|
| Solid solution type 1 | 6.0 wt % |
| Dispersing agent (styrene-acrylic acid copolymer) | 2.4 wt % |
| Glycerin | 12.0 wt % |
| 1,2-hexanediol | 7.0 wt % |
| Triethanolamine | 0.9 wt % |
| KF-353A (made by Shin-Etsu Chemical Co., Ltd.) | 0.1 wt % |
| Ultrapure water | Remainder |
| Total | 100.0 wt % |

Similarly, as the embodiment, a magenta ink composition having the same composition as (M1-1) to (M1-3) except that a solid solution type 2 in which a ratio of the weight of γ-type PV19 to the weight of PR202 is 55:45 is used instead of the solid solution type 1 was prepared. A composition (M2-1) in which the concentration of the solid solution type 2 is 2 wt %, a composition (M2-2) in which the concentration of the solid solution type 2 is 4 wt %, and a composition (M2-3) in which the concentration of the solid solution type 2 is 6 wt % were prepared.

As a comparative example, a magenta ink composition having the same composition as (M1-1) to (M1-3) except that single crystal PR122 is included instead of the solid solution type 1 was prepared. A composition (m3-1) in which the concentration of the single crystal PR122 is 2 wt %, a composition (m3-2) in which the concentration of single crystal PR122 is 4 wt %, and a composition (m3-3) in which the concentration of single crystal PR122 is 6 wt % were prepared.

As another comparative example, a magenta ink composition having the same composition as (M1-1) to (M1-3) except that PV19 is included instead of the solid solution type 1 was prepared. A composition (m4-1) in which the concentration of the PV19 is 2 wt %, a composition (m4-2) in which the concentration of PV19 is 4 wt %, and a composition (m4-3) in which the concentration of PV19 is 6 wt % were prepared.

As another comparative example, a magenta ink composition having the same composition as (M1-1) to (M1-3) except that PV32 is included instead of the solid solution type 1 was prepared. A composition (m5-1) in which the concentration of the PV32 is 2 wt %, a composition (m5-2) in which the concentration of PV32 is 4 wt %, and a composition (m5-3) in which the concentration of PV32 is 6 wt % were prepared.

With respect to the prepared magenta ink compositions, 2000-fold dilution and 10000-fold dilution were performed by water and the L* value, the a* value and the b* value were measured with respect to the diluted aqueous solutions.

The L* value, the a* value and the b* value of the aqueous solutions were measured U3300 manufactured by Hitachi Ltd. In more detail, the transmissivity was measured under the condition that a scan speed is 600 nm/min, a measurement wavelength range is 380 to 800 nm and a slit width is 2.0 nm and a calculation was performed in a D65 light source and a viewing angle of 2 degrees.

The result is shown in Table 1.

TABLE 1

| Dilution degree | 2000-fold | | | 10000-fold | | |
|---|---|---|---|---|---|---|
| | L* | a* | b* | L* | a* | b* |
| M1-1(2%) | 87.54 | 28.20 | −12.76 | 96.46 | 8.23 | −3.85 |
| M1-2(4%) | 78.18 | 51.71 | −21.32 | 94.28 | 13.43 | −6.18 |
| M1-3(6%) | 72.69 | 64.22 | −24.91 | 91.39 | 20.35 | −9.23 |
| M2-1(2%) | 89.13 | 22.00 | −12.35 | 96.28 | 7.54 | −4.31 |
| M2-2(4%) | 80.91 | 38.76 | −20.68 | 94.55 | 11.17 | −6.40 |
| M2-3(6%) | 74.35 | 52.63 | −26.86 | 93.19 | 13.90 | −7.82 |
| m3-1(2%) | 86.31 | 25.29 | −14.27 | 95.81 | 7.12 | −4.30 |
| m3-2(4%) | 76.59 | 44.45 | −22.90 | 93.98 | 10.69 | −6.41 |
| m3-3(6%) | 69.53 | 58.43 | −27.71 | 91.47 | 14.77 | −8.71 |
| m4-1(2%) | 88.32 | 23.82 | −7.98 | 97.50 | 5.28 | −1.86 |
| m4-2(4%) | 80.21 | 43.10 | −14.49 | 95.24 | 10.33 | −3.98 |
| m4-3(6%) | 73.96 | 54.34 | −16.54 | 93.24 | 14.33 | −5.36 |
| m5-1(2%) | 74.45 | 40.90 | −24.57 | 93.98 | 9.27 | −6.16 |
| m5-2(4%) | 58.47 | 67.25 | −35.56 | 88.46 | 17.87 | −11.65 |
| m5-3(6%) | 50.47 | 81.65 | −35.00 | 80.14 | 25.95 | −15.01 |

As shown in Table 1, it can be seen that, in the magenta ink compositions M1 and M2 according to the embodiments of the present invention, the L* value and the a* value in the CIE standard calculated from the visible absorption spectrum in a not more than 10000-fold diluted aqueous solution are high and color reproduction is excellent. In addition, it can be seen that, in the magenta ink compositions M1 and M2 according to the embodiments of the present invention, the CIE standard calculated from the visible absorption spectrum in a not more than 10000-fold diluted aqueous solution has slightly lower lightness than PV19 (m4), but the b* value is smaller.

As shown in Table 1, in the magenta ink compositions M1 and M2 according to the embodiments, the L* value is not less than 96 and the a* value is not less than 7.5 in 10000-fold dilution and 2 wt % (aqueous solution having a pigment concentration of $2 \times 10^{-3}$ g/l).

Figure 3:
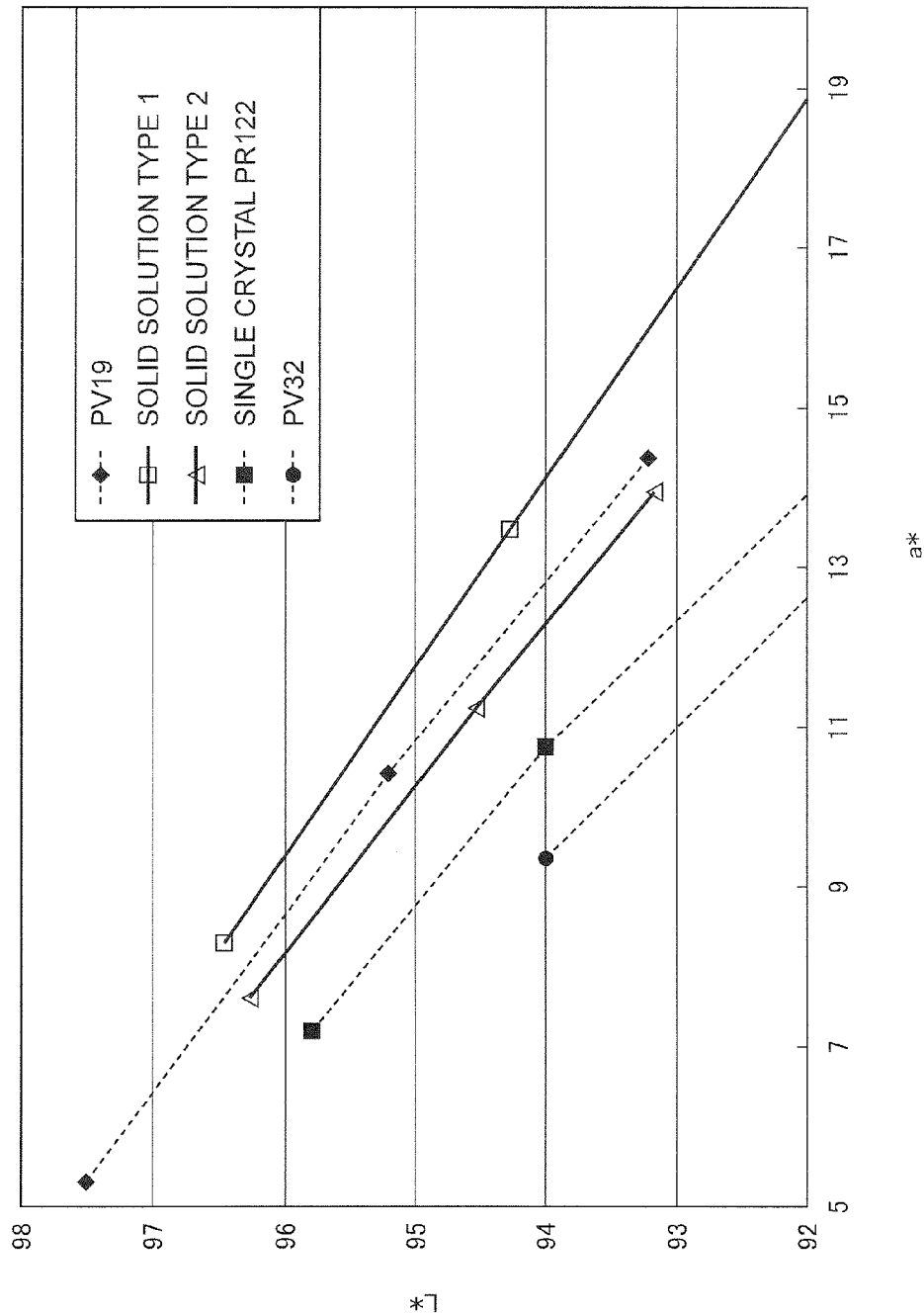
FIG. 3 is a graph showing a relationship between L* values and a* values of aqueous solutions diluted using magenta ink compositions.

Graphs showing the 10000-fold diluted aqueous solution and data of the concentration of 2.0 wt % shown in FIGS. 3 and 4. That is, FIG. 3 is a graph showing a relationship between the L* value and the a* value in the 10000-fold diluted aqueous solution and FIG. 4 is a graph showing a relationship between the L* value and the b* value in the 10000-fold diluted aqueous solution.

As shown in FIGS. 3 and 4, the magenta ink compositions M1 and M2 according to the embodiments, when the L* value in a not more than 10000-fold diluted aqueous solution is 94, the a* value was not less than 11.5 and the b* value was not more than −5.5.

Embodiment B

The magenta ink composition including the solid solution type 1 was prepared by the following composition.

| | |
|---|---|
| Solid solution type 1 | 4.0 wt % |
| Dispersing agent (styrene-acrylic acid copolymer) | 2.0 wt % |
| Glycerin | 14.0 wt % |
| 1,2-hexanediol | 7.0 wt % |
| Triethanolamine | 0.9 wt % |
| KF-353A (made by Shin-Etsu Chemical Co., Ltd.) | 0.1 wt % |
| Ultrapure water | Remainder |
| Total | 100.0 wt % |

Instead of the solid solution type 1 of 4.0 wt %, an ink composition having the same composition except that the solid solution type 2 of the solid solution of 4.0 wt % is used, an ink composition having the same composition except that single crystal PR122 of 4.0 wt % is used, an ink composition having the same composition except that PV19 of 4.0 wt % is used, and an ink composition having the same composition except that PV32 of 4.0 wt % is used were prepared.

Thereafter, the prepared magenta ink compositions are diluted by water such that the a* value becomes 80. The aqueous solution including the solid solution type 1 requires about 810-fold dilution, the aqueous solution including the solid solution type 2 requires about 650-fold dilution, the aqueous solution including single crystal PR122 requires about 700-fold dilution, the aqueous solution including PV19 requires about 500-fold dilution, and the aqueous solution including the solid solution type 1 including PV32 requires about 1500-fold dilution.

The L* value, the a* value and the b* value of the aqueous solutions were measured U3300 manufactured by Hitachi Ltd. In more detail, the transmissivity was measured under the condition that a scan speed is 600 nm/min, a measurement wavelength range is 380 to 800 nm and a slit width is 2.0 nm and a calculation was performed in a D65 light source and a viewing angle of 2 degrees.

The result is shown in Table 2.

TABLE 2

| | a*80 | | |
|---|---|---|---|
| | L* | b* | Dilution degree |
| Solid solution type 1 (4%) | 64.80 | −26.94 | about 810-fold |
| Solid solution type 2 (4%) | 61.50 | −35.96 | about 650-fold |
| Single crystal PR122 (4%) | 57.33 | −29.93 | about 700-fold |
| PV19 (4%) | 61.04 | −16.72 | about 500-fold |
| PV32 (4%) | 49.51 | −38.60 | about 1500-fold |

As shown in Table 2, in the solid solution types 1 and 2, when the a* value in a not more than 10000-fold diluted aqueous solution is 80, the L* value was not less than 60 and the b* value was not more than −17. By using the magenta ink composition according to the embodiment having such characteristics, in the recorded matter, color reproduction can be realized in a high L* value, a high a* value and a low b* value, color reproduction in a high-lightness red region is excellent, and color reproduction in a violet region is excellent.

Embodiment C

The magenta ink composition including the solid solution type 1 was prepared by the following composition.

Type 1

Embodiment 1

| | |
|---|---|
| Solid solution type 1 | 3.0 wt % |
| Dispersing agent (styrene-acrylic acid copolymer) | 0.9 wt % |
| Glycerin | 14.0 wt % |
| 1,2-hexanediol | 7.0 wt % |
| Triethanolamine | 0.9 wt % |
| KF-353A (made by Shin-Etsu Chemical Co., Ltd.) | 0.1 wt % |
| Ultrapure water | Remainder |
| Total | 100.0 wt % |

Instead of KF-353A (manufactured by Shin-Etsu Chemical Co., Ltd.) which is the surfactant of Embodiment 1, compositions of Embodiment 2 having the same composition except that 0.1 wt % of KF-945A (manufactured by Shin-Etsu Chemical Co., Ltd.) is used, Embodiment 3 having the same composition except that 0.07 wt % of AW-3 (manufactured by Shin-Etsu Chemical Co., Ltd.) and 0.03 wt % of KF-6017 (manufactured by Shin-Etsu Chemical Co., Ltd.) are used, Embodiment 4 having the same composition except that 0.09 wt % of AW-3 (manufactured by Shin-Etsu Chemical Co., Ltd.) and 0.01 wt % of X-22-6551 (manufactured by Shin-Etsu Chemical Co., Ltd.) are used, and Embodiment 5 having the same composition except that 0.1 wt % of SF-465 (manufactured by Shin-Etsu Chemical Co., Ltd.) is used were prepared.

(Evaluation of Gloss)

The obtained magenta ink compositions were charged in an ink jet printer PX-G900 (manufactured by Seiko Epson Corporation) and printing was performed on glossy paper <gloss> (manufactured by Seiko Epson Corporation) as an example of a medium having a coating layer, thereby obtaining recorded matters. In the printing, a duty was changed in a range of 5 to 100 (ink weight of 0.3 to 13 mg/inch$^2$) such that the magenta ink was ejected.

With respect to the obtained recorded matters, the reflected light intensity having a reflection angle of 42 to 48 degrees was measured using automatic goniophotometer GP-200 (manufactured by MURAKAMI COLOR RESEARCH LABORATORY CO., Ltd.) at an incident angle of 45° (slit width; incident side φ1 mm, reflection side φ1.5 mm), a sensitivity of 500, and a tilt angle of 0°. At this time, a halogen lamp (12 V, 50 W) as a light source and a ND-10 filter were used, and the voltage applied to the light source was adjusted to obtain a glossiness of the standard plate of 442.5. The maximum value of the reflected light intensity values measured under the conditions was designated as a maximum glossiness. The reproduction error was ±2.0 or less.

The glossiness of the recorded matter was calculated by the following equation.

$$\text{Gloss} = (\text{glossiness})/(\text{image sharpness})^2$$

Here, the glossiness indicates glossiness obtained by the measurement and the image sharpness indicates the degree of the image sharpness of the recorded image (also referred to as a representation property) and the width of the reflection angle having 0.6 or more among the values of the reflected light intensity measured when the glossiness is measured. The glossiness calculated in the above equation is appropriately matched to the evaluation of the glossiness by naked eyes. Evaluation criteria are as follows. The evaluated result is shown in Table 3.

A: maximum glossiness of 30 or more
B: maximum glossiness of less than 30

(Evaluation of Agglomeration Unevenness of Ink)

The obtained ink compositions were mounted in an ink cartridge of an ink jet printer (PX-G900, manufactured by Seiko Epson Corporation) and printing was performed on OK overcoat plus (manufactured by Oji Paper Co., Ltd.), which is print paper, with resolution of 2880×1440 dpi. At this time, as a printing condition, the ejection amount of ink was adjusted to become a dot weight of 7 ng in a single-direction recording method with resolution of 720×180 dpi by one-time driving of the recording head. The driving head is 200 cps.

In the obtained recorded matters, agglomeration unevenness of the ink was evaluated by the following criteria.

A: The agglomeration unevenness is not present even in an ink weight of 3.6 mg/inch².
B: The agglomeration unevenness is not present even in an ink weight of 2.8 mg/inch².
C: The agglomeration unevenness is generated even in an ink weight of 2.8 mg/inch².

The evaluated result is shown in Table 3.

TABLE 3

|  | Gloss | agglomeration unevenness |
|---|---|---|
| Embodiment 1 | A | B |
| Embodiment 2 | B | A |
| Embodiment 3 | A | B |
| Embodiment 4 | A | A |
| Embodiment 5 | B | C |

As shown in Table 3, in Embodiments 1 to 5, it can be seen that the gloss and the suppression of the agglomeration unevenness when recorded on print paper are compatible.

(Evaluation of Recorded Matter)

Next, instead of the solid solution type 1 of Embodiment 1, compositions of Embodiment 2 having the same composition except that the solid solution type 2 is used, Comparative example 1 having the same composition except that single crystal PR122 is used, Comparative example 2 having the same composition except that PV19 is used and Comparative example 3 having the same composition except that PV32 is used were prepared.

The obtained magenta ink compositions of Embodiments 1 to 2 and Comparative examples 1 to 3 were charged in an ink jet printer PX-G900 (manufactured by Seiko Epson Corporation) and printing was performed on golly paper <gloss> manufactured by Seiko Epson Corporation) as an example of a medium having a coating layer, thereby obtaining recorded matters. In the printing, a duty was changed in a range of 5 to 100 (ink weight of 0.3 to 13 mg/inch²) such that the magenta ink was ejected.

With respect to the obtained recorded matters, the L* value, the a* value and the b* value defined by CIE were measured by SPM-50 (manufactured by GretagMacbeth Corporation) with a D50 light source and a viewing angle of 2 degrees and without a filter. The result is shown in FIGS. 1 and 2.

FIG. 1 is a graph showing a relationship between a* values and b* values of recorded matters recorded using magenta ink compositions.

Figure 2:
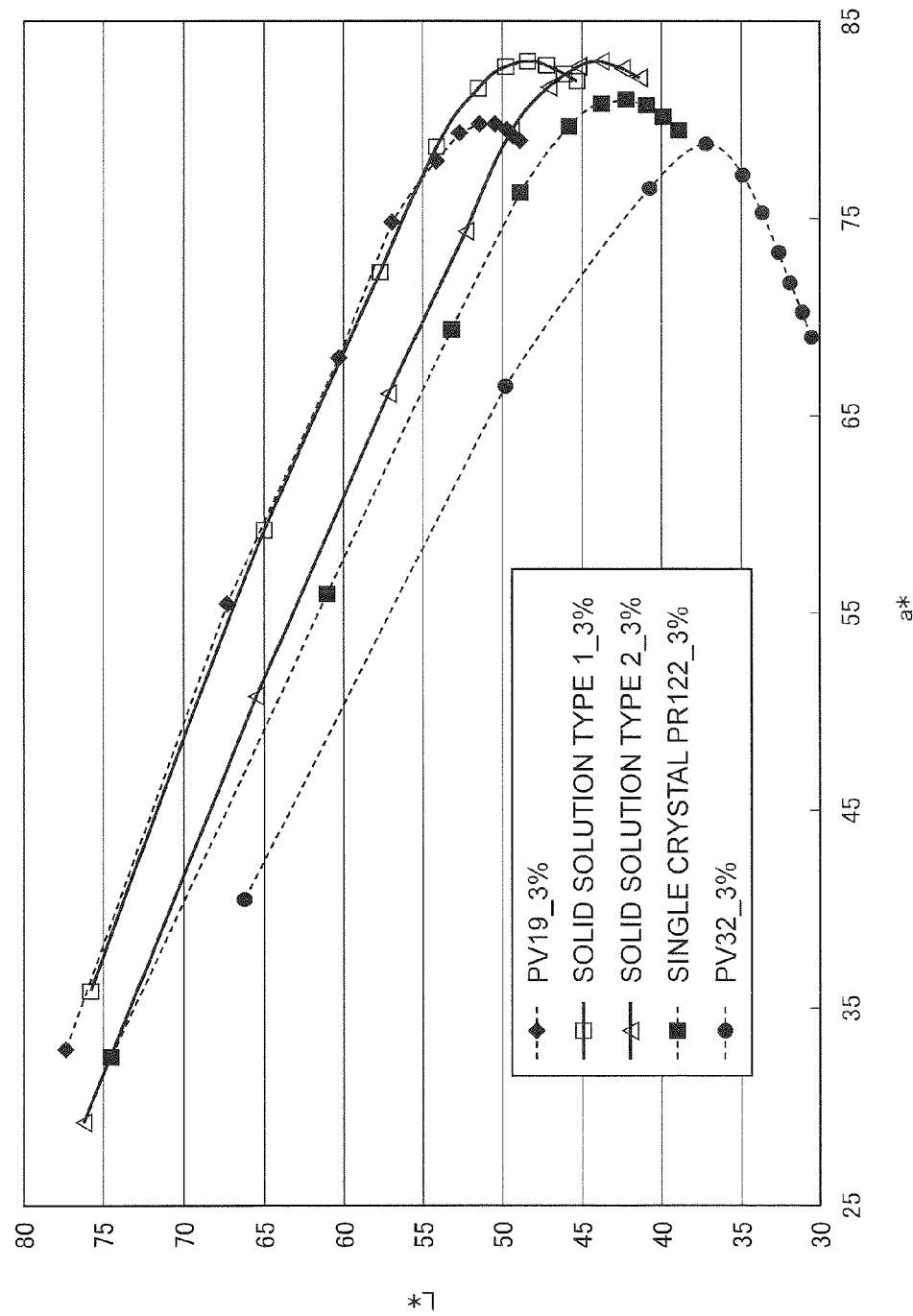
FIG. 2 is a graph showing a relationship between a* values and L* values of recorded matters recorded using magenta ink compositions.

FIG. 2 is a graph showing a relationship between a* values and L* values of recorded matters recorded using magenta ink compositions.

As shown in FIG. 2, even in the recorded matter, color reproduction of a high L* value and a high a* value was excellent and color reproduction in the high-lightness red region was excellent.

As shown in FIGS. 1 and 2, in the recorded matter, color reproduction in the high-lightness red region having a high L* value and a high a* value was excellent and color reproduction in the violet region having a low b* value was excellent. That is, in the recorded matter, color reproduction can be realized with a high L* value, a high a* value and a low b* value.

Embodiment D

The magenta ink composition including the solid solution type 1 and the solid solution type 3 having a weight ratio of γ-type PV19 to PR202 of 40:60 was prepared as follows.

Type 1

Embodiment 6

Preparation of Pigment Kneaded Material

The solid solution type 1 was put in a sealing-system pressurizing kneader with the following composition ratio, kneading was for 10 hours at 130° C. and a pigment kneaded material was prepared.

| Solid solution type 1 | 20 wt % |
|---|---|
| Dispersing agent (styrene-acrylic acid copolymer; acid value 260, weight average molecular amount 18000, glass transition temperature 110 degrees) | 10 wt % |
| Glycerin | 15 wt % |
| Isopropyl alcohol | 4 wt % |
| Total | 49 wt % |

Next, the following components were put in an agitator, overheating and agitation were performed for two hours at 130° C., and a regulating solution before pigment dispersion was prepared.

(Preparation of Regulating Solution before Pigment Dispersion)

| Pigment kneaded material | 49 wt % |
|---|---|
| Triethanolamine (neutralizing agent) | 3 wt % |
| Deionized water | 48 wt % |
| Total | 100 wt % |

(Preparation of Regulating Material after Pigment Dispersion)

Next, the obtained regulating solution before pigment dispersion was put in a miniaturizable bead mill (having an organic pigment particle generation capability of 50 nm), dispersion was performed by 3-pass process, and a regulating material after pigment dispersion was prepared.

(Preparation of Pigment Dispersion Solution)

The obtained regulating material after pigment dispersion was adjusted to pH 8.5 with sodium hydroxide, centrifugal processing was performed for 5 minutes at 25000 G to remove coarse particles, and regulation was performed by deionized water such that solid content becomes 10 wt %, thereby obtaining a pigment dispersion.

The obtained pigment dispersion was a high-concentration coloring liquid composition, pH is 8.3, and a pigment particle diameter (volume 50% dispersion diameter) was 100 nm.

(Preparation of Magenta Ink Composition)

The magenta ink composition was obtained by the following compositions.

| Pigment dispersion solution | 40.0 wt % |
|---|---|
| Glycerin | 14.0 wt % |
| 1,2-hexanediol | 7.0 w t% |
| Triethanolamine | 0.9 wt % |
| BYK347 | 0.1 wt % |
| Ultrapure water | remainder |
| Total | 100.0 wt % |

Type 3

Embodiment 7

Preparation of Pigment Kneaded Material

A magenta ink composition including the solid solution type 3 was prepared similar to Embodiment 6, except that 20 wt % of solid solution type 3 having a weight ratio of γ-type PV19 to PR202 of 40:60 is used instead of 20 wt % of the solid solution type 1.

After the magenta ink compositions of Embodiments 6 and 7 are prepared, the ink compositions are diluted by water such that the a* value becomes 80. In an aqueous solution of Embodiment 6, about 820-fold dilution is required and, in an aqueous solution of Embodiment 7, about 640-fold dilution is required.

The measurement of the L* value, the a* value and the b* value of the aqueous solutions was performed using U3300 manufactured by Hitachi Ltd. In more detail, transmissivity was measured under the condition that a scan speed is 600 nm/min, a measurement wavelength range is 380 to 800 nm and a slit width is 2.0 nm and calculation is performed in a D65 light source and a viewing angle of 2 degrees. The result is shown in Table 4.

TABLE 4

|  | a*80 | | |
| --- | --- | --- | --- |
|  | L* | b* | Dilution degree |
| Embodiment 6 | 64.60 | −26.25 | About 820-fold |
| Embodiment 7 | 61.80 | −36.80 | About 640-fold |

As shown in Table 4, in Embodiments 6 and 7, when the a* value in a not more than 10000-fold dilution aqueous solution is 80, The L* value was not less than 60 and the b* value was not more than −17.

By using the magenta ink composition of the embodiment having such characteristics, in the recorded matter, color reproduction can be realized in a high L* value, a high a* value and a low b* value, color reproduction in a high-lightness red region is excellent, and color reproduction in a violet region is excellent.

Next, the magenta ink compositions of Embodiments 6 and 7 were charged in an ink jet printer PX-G900 (manufactured by Seiko Epson Corporation) and printing was performed on glossy paper <gloss> (manufactured by Seiko Epson Corporation) as an example of a medium having a coating layer, thereby obtaining recorded matters. In the printing, a duty was changed in a range of 5 to 100 (ink weight of 0.3 to 13 mg/inch$^2$) such that the magenta ink was ejected.

With respect to the obtained recorded matters, the L* value, the a* value and the b* value in the CIE standard were measured by SPM-50 (manufactured by GretagMacbeth Corporation) with a D50 light source and a viewing angle of 2 degree without a filter. Maximum a* values of the recorded materials are shown in Table 5.

TABLE 5

|  | Maximum a* value |
| --- | --- |
| Embodiment 6 | 82.8 |
| Embodiment 7 | 81.2 |

As shown in Table 5, in Embodiments 6 and 7, the a* value is not less than 80 and color development is excellent.

Embodiment E

Type 2

Embodiment 8

In Embodiment 4, the ink composition having the same composition was prepared except that the solid state type 2 is used instead of the solid solution type 1.

Type 4

Embodiment 9

In Embodiment 4, the ink composition having the same composition was prepared except that the solid solution type 4 in which a weight ratio of γ-type PV19 to PR202 is 65:35 is used instead of the solid solution type 1.

Type 5

Embodiment 10

In Embodiment 4, the ink composition having the same composition was prepared except that the solid solution type 5 in which a weight ratio of γ-type PV19 to PR202 is 60:40 is used instead of the solid solution type 1.

Type 6

Embodiment 11

In Embodiment 4, the ink composition having the same composition was prepared except that the solid solution type 6 in which a weight ratio of γ-type PV19 to PR202 is 50:50 is used instead of the solid solution type 1.

Comparative Examples 1 and 2

As Comparative Example 1, the ink composition having the same composition as Embodiment 4 was prepared except that single crystal PR122 is used instead of the solid solution type 1 and, as Comparative Example 2, the ink composition was prepared as Embodiment 4 except that PV19 is used instead of the solid solution type 1.

In the obtained ink compositions, agglomeration unevenness of the ink and gloss were evaluated by the same method as Embodiment C. The graininess, the color development of resin coated paper, and the color development of laser paper were evaluated by the following method.

[Evaluation of Graininess]

The graininess is susceptible to be compared when the recording medium is coated by the ink by a half and the duty is generally 20% in resin coated paper. The duty of 20% of the magenta ink having a pigment concentration of 4% or less corresponds to the duty of a human skin because the lightness of resin coated paper is 50 to 70.

Accordingly, if the type of the pigment which is the coloring material is different, the lightness of the duty of 20% is high. In addition, as the a* value is high, the graininess is excellent. That is, although the concentration of the coloring material is low, the color development can be maintained in the high a* value. Accordingly, it is possible to realize high lightness.

In FIG. 2, a second plot from a side in which the a* value is low corresponds to the duty of 20%.

The ink compositions were recorded on resin coated paper by the known method and were evaluated by the following criteria.

A: When the duty is 20%, the lightness is not less than about 65 and the a* value is not less than about 55.

B: When the duty is 20%, the lightness is not less than about 65.

C: When the duty is 20%, the lightness is not more than about 65.

[Evaluation of Color Development of Resin Coated Paper (Color Development of RC Paper)]

In an ideal magenta color in color reproduction of medium-lightness red and blue regions having an L* value of 40 to 60, the a* value is high when the L* value is 50 to 60 and the b* value is −15.

The reason is because the lightness of the magenta color is generally lower than that of the yellow color and is equal to that of the cyan color as defined in JapanColor. Since the hue angle of the yellow ink jet ink is about 90 degrees and the hue angle of the cyan ink jet ink is about 240 degrees, it is preferable that the hue angle of the magenta ink jet ink is about 15 degrees from the viewpoint of the color development.

In FIG. 1, a sixth plot from a side in which the a* value is low corresponds to the duty of 60%, a seventh plot corresponds to the duty of 70% and an eighth plot corresponds to the duty of 80%.

The ink compositions were recorded on resin coated paper by the known method and were evaluated by the following criteria.

A: When the b* value is −15, the a* value is not less than 80 and the duty at that time is about 60%.

B: When the b* value is −15, the a* value is not less than 80 and the duty at that time is about 70%.

C: When the b* value is −15, the a* value is not less than 80 and the duty at that time is about 80%.

D: When the b* value is −15, the a* value is less than 80.

(Color Development of Laser Paper)

Recently, like a print paper used in a catalog/pamphlet, an on-demand print of a double-sided printable recording medium with a waterproof property has come into wide use. This requirement can be preferably used in laser from the viewpoint of user utility.

However, since a recording medium such as LPCCT (color laser paper) is hard to absorb the ink jet ink, the magenta ink including magenta pigment species developed with a small ink attachment amount is preferred.

The obtained ink compositions were mounted in an ink cartridge of an ink jet printer (PX-G900, manufactured by Seiko Epson Corporation) and printing was performed on LPCCTA4 (manufactured by Oji Paper Co., Ltd.), which is print paper, with resolution of 2880×1440 dpi. At this time, as a printing condition, the ejection amount of ink was adjusted to become a dot weight of 7 ng in a single-direction recording method with resolution of 720×180 dpi by one-time driving of the recording head. The driving head is 200 cps.

The obtained recorded matters were evaluated by the following criteria.

A: The agglomeration unevenness is not present even in an ink weight of 5.6 mg/inch$^2$ and an OD(Dm) value is not less than 1.2.

B: The agglomeration unevenness is not present even in an ink weight of 5.6 mg/inch$^2$ and an OD(Dm) value is not less than 1.0 and is less than 1.2.

C: The agglomeration unevenness is generated even in an ink weight of 5.6 mg/inch$^2$ and an OD(Dm) value is less than 1.0.

The evaluated result is shown in Table 6.

TABLE 6

| | Magenta ink | gloss | grain-iness | Color development of RC paper | Agglomeration unevenness | Color development of laser exclusive paper |
|---|---|---|---|---|---|---|
| Embodiment 4 | Solid solution type 1 | A | A | A | A | A |
| Embodiment 8 | Solid solution type 2 | A | B | C | A | A |
| Embodiment 9 | Solid solution type 4 | A | A | A | A | A |
| Embodiment 10 | Solid solution type 5 | A | B | B | A | A |
| Embodiment 11 | Solid solution type 6 | A | B | C | A | B |
| Comparative Example 1 | PR122 | A | C | A | A | A |
| Comparative Example 2 | PV19 | A | B | D | A | B |

As shown in Table 6, in Embodiment of using the solid solution such as γ-type PV19 and PR202, it can be seen that the gloss, graininess, color development of RC paper, the prevention of the agglomeration unevenness and color development of laser paper are compatible.

Embodiment F

Embodiments 12 to 15

The same ink composition as Embodiment 6 except that the solid solution type 2 is used instead of the solid solution type 1 was obtained (Embodiment 12).

The same ink composition as Embodiment 6 except that the solid solution type 4 is used instead of the solid solution type 1 was obtained (Embodiment 13).

The same ink composition as Embodiment 6 except that the solid solution type 5 is used instead of the solid solution type 1 was obtained (Embodiment 14).

The same ink composition as Embodiment 6 except that the solid solution type 6 is used instead of the solid solution type 1 was obtained (Embodiment 15).

Embodiments 16 to 21

In Embodiment 6, an ink composition was obtained by the composition (total 100.0 wt %) including 40.0 wt % of solid solution type 1 which is dispersed by the known method (that is, is not kneaded), 14.0 wt % of glycerin, 7.0 wt % of 1,2-hexanediol, 0.9 wt % of triethanolamine, 0.1 wt % of BYK347, and ultrapure water (remainder) (Embodiment 16).

In Embodiment 16, instead of the solid solution type 1, the ink compositions of Embodiment 17 having the same composition except that the solid solution type 3 is used, Embodiment 18 having the same composition except that the solid solution type 2 is used, Embodiment 19 having the same composition that the solid solution type 4 is used, Embodiment 20 having the same composition except that the solid solution type 5 is used, and Embodiment 21 having the same composition except that the solid solution type 6 is used were obtained.

Embodiments 22 to 27

In Embodiment 6, an ink composition was obtained by the composition (total 100.0 wt %) including 40.0 wt % of solid solution type 1 which is kneaded and dispersed and is subjected to the ultrafiltration classification process, 14.0 wt % of glycerin, 7.0 wt % of 1,2-hexanediol, 0.9 wt % of triethanolamine, 0.1 wt % of BYK347, and ultrapure water (remainder) (Embodiment 22).

In Embodiment 22, instead of the solid solution type 1, the ink compositions of Embodiment 23 having the same composition except that the solid solution type 3 is used, Embodiment 24 having the same composition except that the solid solution type 2 is used, Embodiment 25 having the same composition that the solid solution type 4 is used, Embodiment 26 having the same composition except that the solid solution type 5 is used, and Embodiment 27 having the same composition except that the solid solution type 6 is used were obtained.

The obtained ink compositions were evaluated by the following method.

(Clogging Recovery Property)

The magenta ink compositions of Embodiments 6, 7 and 12 to 27 were charged in PX-G900 and the ink cartridge and the head are detached. This head was input by 40 degrees for one cycle. Thereafter, the head returned to an original state, a cleaning button was pressed eight times, and it is checked whether the ink can be ejected from all the nozzles.

A: All the nozzles are recovered.
B: All the nozzles are not recovered.

(Ejection Stability)

The magenta ink compositions of Embodiments 6, 7 and 12 to 27 were charged in PX-G900 and printing was performed under the condition of 40 degrees and 25% with a recording mode of a fast mode and general paper.

A: Omission is not present although printing is performed with respect to 1000 sheets of paper.
B: Omission is present when printing is performed with respect to 1000 sheets of paper.

The result is shown in Table 7.

TABLE 7

| | Magenta ink | PV19:PR202 | Clogging recovery property | Ejection stability |
|---|---|---|---|---|
| Embodiment 6 | Solid solution type 1 | 70:30 | A | B |
| Embodiment 7 | Solid solution type 3 | 40:60 | A | A |
| Embodiment 12 | Solid solution type 2 | 55:45 | A | A |
| Embodiment 13 | Solid solution type 4 | 65:35 | A | B |
| Embodiment 14 | Solid solution type 5 | 60:40 | A | B |
| Embodiment 15 | Solid solution type 6 | 50:50 | A | A |
| Embodiment 16 | Solid solution type 1 | 70:30 | B | A |
| Embodiment 17 | Solid solution type 3 | 40:60 | A | A |
| Embodiment 18 | Solid solution type 2 | 55:45 | A | A |
| Embodiment 19 | Solid solution type 4 | 65:35 | B | A |
| Embodiment 20 | Solid solution type 5 | 60:40 | B | A |
| Embodiment 21 | Solid solution type 6 | 50:50 | A | A |
| Embodiment 22 | Solid solution type 1 | 70:30 | A | A |
| Embodiment 23 | Solid solution type 3 | 40:60 | A | A |
| Embodiment 24 | Solid solution type 2 | 55:45 | A | A |
| Embodiment 25 | Solid solution type 4 | 65:35 | A | A |
| Embodiment 26 | Solid solution type 5 | 60:40 | A | A |
| Embodiment 27 | Solid solution type 6 | 50:50 | A | A |

As shown in Table 7, in the solid solution in which the weight of PV19 is larger than that of PR202, it can be seen that the clogging recovery property and the ejection stability are excellent when the kneading process, the dispersion process and the classification process are performed.

The invention claimed is:

1. A magenta ink composition comprising at least a solid solution of γ-type C.I. pigment violet 19 and C.I. pigment red 202, and at least one surfactant selected from the group consisting of acetylene glycols and polysiloxanes, wherein, in the solid solution, a ratio of the weight of the γ-type C.I. pigment violet 19 to the weight of the C.I. pigment red 202 is 70/30 to 65/35.

2. The magenta ink composition according to claim 1, comprising a pigment dispersion obtained by a method of kneading the solid solution at a temperature higher than 120° C. and preparing a pigment kneaded material.

3. The magenta ink composition according to claim 2, comprising a pigment dispersion obtained by a method including kneading the solid solution at a temperature higher than 120° C. and preparing a pigment kneaded material and dispersing the composition including the pigment kneaded material to a dispersion treatment material.

4. The magenta ink composition according to claim 3, wherein the method includes performing an ultrafiltration classification process with respect to the dispersion treatment material.

5. The magenta ink composition according to claim 1, comprising one, two, or more of polyhydric alcohols, sugars and polyhydric alcohols with ethylene oxide chains as a wetting agent.

6. The magenta ink composition according to claim 1, comprising one, two, or more of pyrrolidones, alkanediols, glycol ethers as a penetrant.

7. The magenta ink composition according to claim 1, wherein polysiloxanes are expressed by the following formula:

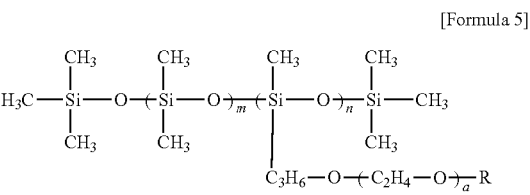

[Formula 5]

wherein R denotes a hydrogen atom or a methyl group, a denotes an integer of 7 to 13, m denotes an integer of 2 to 770 and n denotes an integer of 1 to 5.

8. The magenta ink composition according to claim 1, wherein polysiloxanes are expressed by the following formula:

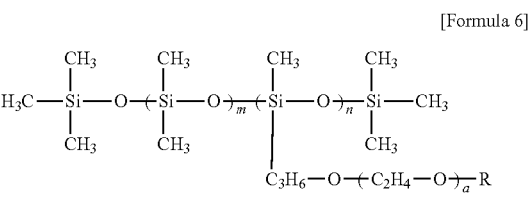

[Formula 6]

wherein R denotes a hydrogen atom or a methyl group, a denotes an integer of 2 to 11, m denotes an integer of 2 to 50 and n denotes an integer of 1 to 5.

9. A method comprising providing the magenta ink composition according to claim 1 and ejecting the ink composition from an inkjet printer onto a recording medium to form recorded matter.

10. An ink cartridge comprising the magenta ink composition according to claim 1.

11. A recording system for forming an image comprising the magenta ink composition according to claim 1.

12. A recorded matter formed by the method of claim 9.

13. The magenta ink composition according to claim 1, wherein the at least one surfactant is a polysiloxane.

14. The magenta ink composition according to claim 1, wherein the at least one surfactant is an acetylene glycol.

* * * * *